United States Patent [19]

King et al.

[11] 4,271,580
[45] Jun. 9, 1981

[54] METHOD OF FORMING WIRE SUPPORT FRAME MEMBER

[75] Inventors: James F. King, Winston-Salem; Gilbert L. Horton, Kernersville, both of N.C.

[73] Assignee: Hanes Corporation, Winston-Salem, N.C.

[21] Appl. No.: 49,461

[22] Filed: Jun. 18, 1979

[51] Int. Cl.³ .............................................. B23P 11/02
[52] U.S. Cl. ........................................ 29/447; 29/458; 29/469.5; 128/476; 156/272; 156/303.1; 264/230
[58] Field of Search ................... 29/469.5, 447, 458; 128/465, 468, 469, 476; 156/272, 303.1; 264/230

[56] References Cited

U.S. PATENT DOCUMENTS

| 2,463,319 | 3/1949 | Schwartz | 128/469 |
| 3,114,374 | 12/1963 | Chalfin | 128/465 |
| 3,126,007 | 3/1964 | Jonas | 128/476 |
| 3,140,494 | 7/1964 | Magidson | 128/476 X |
| 3,209,756 | 10/1965 | Rowell | 128/476 |
| 3,562,802 | 2/1971 | Avis | 128/476 |
| 3,599,643 | 8/1971 | Schwartz | 128/465 |
| 3,605,753 | 9/1971 | Schwartz | 128/476 |
| 3,702,614 | 11/1972 | Miller | 128/476 |
| 3,798,094 | 3/1974 | Costa | 156/272 X |
| 4,188,769 | 2/1980 | Bright, Jr. | 156/272 X |

FOREIGN PATENT DOCUMENTS 808725 2/1959 United Kingdom .................... 156/272

Primary Examiner—Charlie T. Moon
Attorney, Agent, or Firm—Charles Y. Lackey; William S. Burden

[57] ABSTRACT

A support frame for garments such as brassieres, swimsuits and the like, and a system for forming the support frames. The wire member of each support frame is formed in a preselected, prescribed configuration and plastic protective end caps are adhered to the wire member end portions in a selected manner. The wire end may be modified by a cutter assembly which includes guiding and aligning apparatus for properly locating the wire frame ends relative to spaced rotating saws to remove selected portions and define a centrally located protruding tip portion intermediate spaced shoulders.

13 Claims, 14 Drawing Figures

U.S. Patent Jun. 9, 1981 Sheet 1 of 2 4,271,580
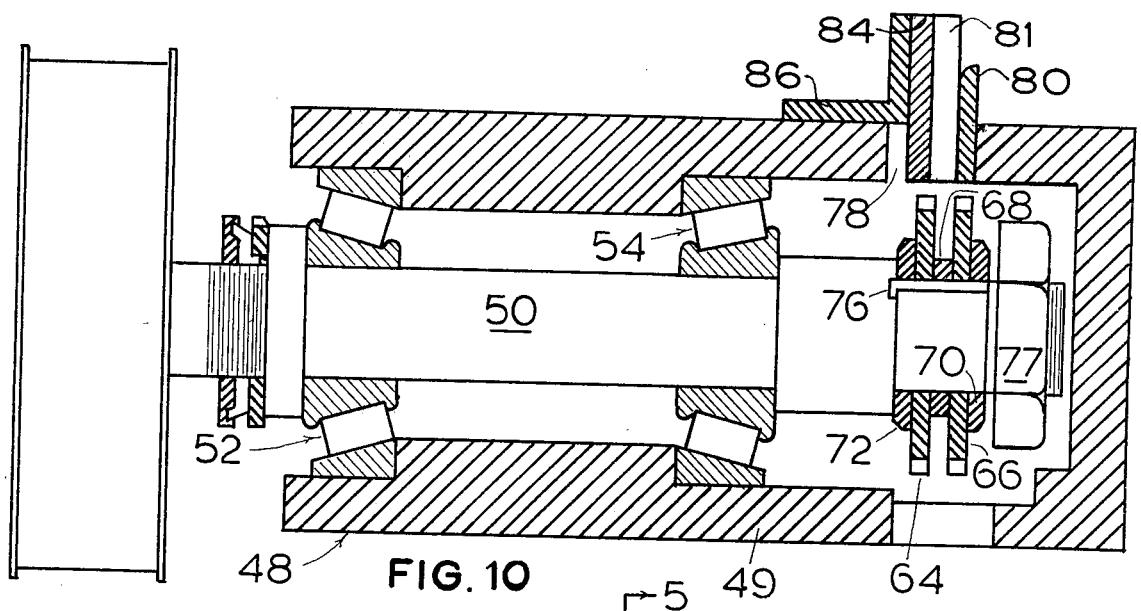
FIG. 10
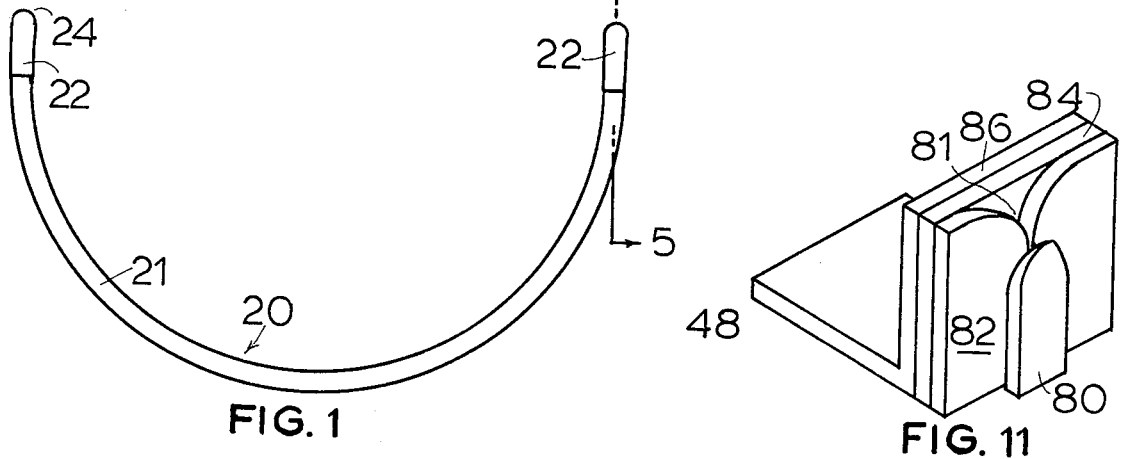
FIG. 1
FIG. 11
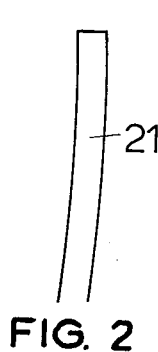
FIG. 2
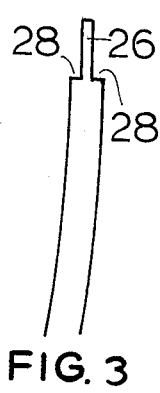
FIG. 3
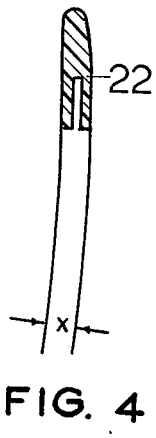
FIG. 4
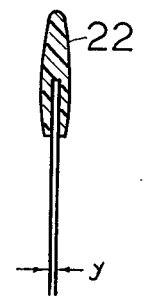
FIG. 5

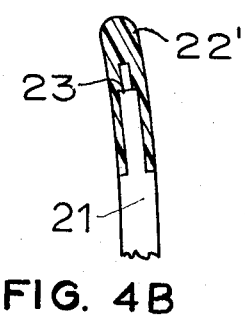
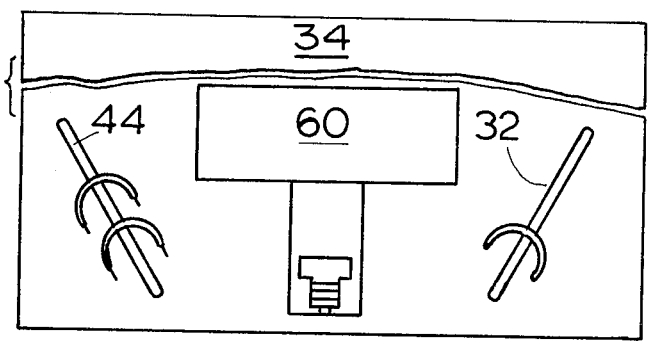
FIG. 4B
FIG. 6
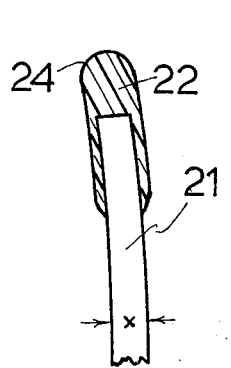
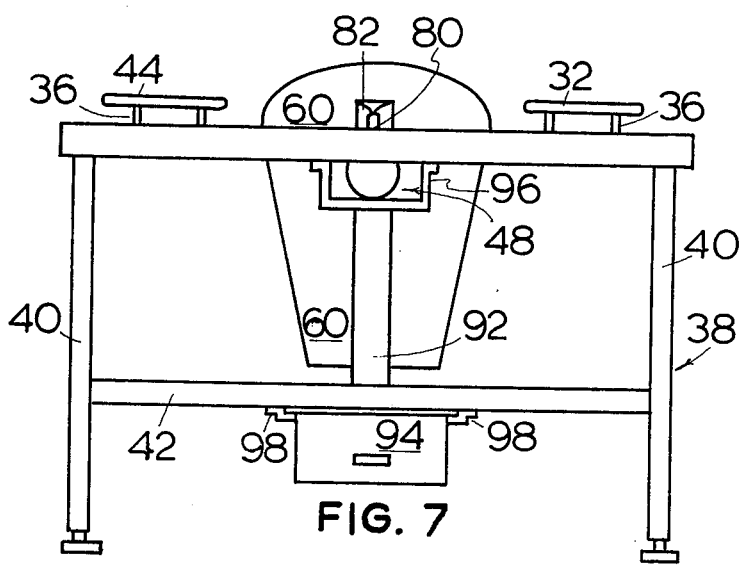
FIG. 12
FIG. 7
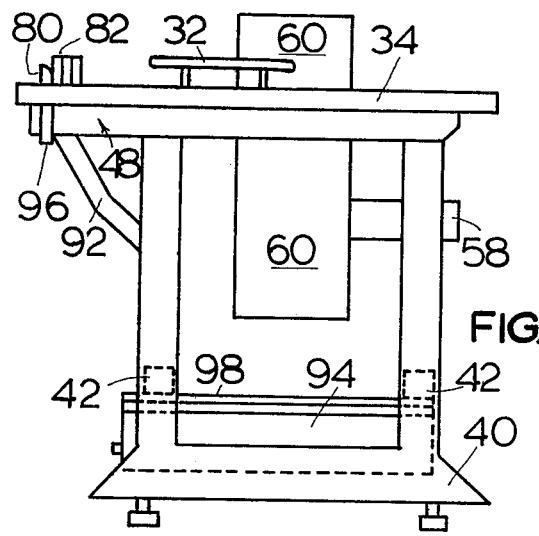
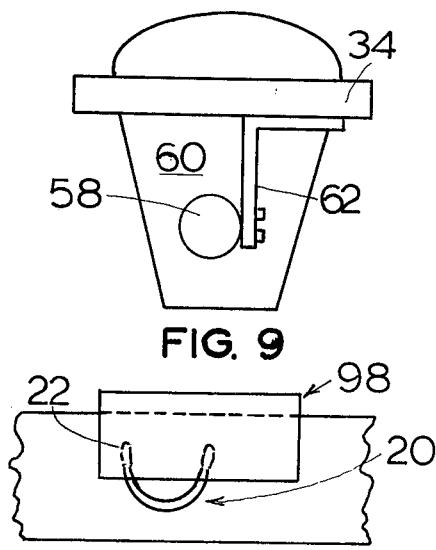
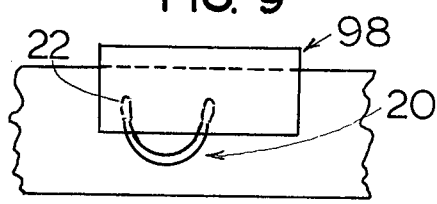
FIG. 8
FIG. 9
FIG. 13

METHOD OF FORMING WIRE SUPPORT FRAME MEMBER

BRIEF SUMMARY AND OBJECTS OF THE INVENTION

The present invention relates generally to wire support frames for garments, and more particularly to a novel wire support frame and system for positively locking plastic, protective end caps in a selected position upon the end portions of a wire member. The novel system for adhering the end caps on the wire frame ends may include modifying the frame ends prior to locking the end caps in position.

The use of arcuate shaped frames for brassieres and other garments for providing added support is old and well known. The frames normally are sewn into channels or seams circumscribing the lower portions of breast supporting pockets. While the frames may be of various materials having the desired hardness as well as lateral and longitudinal flexibilities, normally they are of steel construction. The frames are generally semi-circular or U-shaped having a rectangular cross-sectional configuration for providing the proper resiliency and flexibility in both the longitudinal and lateral directions, while at the same time providing the necessary strength and rigidity. To eliminate discomfort to the wearer of a garment incorporating the wire frames and prevent damage to the garment fabric, the end portions of the wire frmes normally are provided with plastic material which may be applied by dipping the ends into a resin material or may be applied to the frame end portions in the form of plastic caps or tips. The caps have an opening in one end for receiving an end portion of a wire frame and the opposite end normally is tapered. The caps may be of such dimensions and have openings sufficiently large to completely encompass wire frame end portions or, the tip end portions of the wire frames may be reduced in width to receive end caps having a width corresponding substantially to the width of the wire frame.

Normally, in the present invention, the frames are formed by cutting the wire, which may be supplied from a coil, to a specified length and then bending the wire into a specific arcuate configuration. End portions of the frames may be cut away to form reduced tip portions for receiving the end caps and the caps are selectively positioned and adhered to the frame end portions.

When end portions of the frame are to be modified, a novel assembly is provided which guides, aligns and directs an advancing end portion of a frame to a cutting assembly where selected portions are removed to form spaced shoulders and a protruding tip portion for slidably receiving a cap. The cutter assembly defines and limits the width and length of the protruding tip portion.

One of the primary objects of the invention is the provision of a new and improved wire support frame and a system for forming the same.

An important object of the invention is the provision of a novel system for positively securing end caps upon wire frame end portions.

Another important object of the invention is the provision of a new and improved system for trimming selected portions of a wire frame end portion to a desired configuration for receiving an end cap.

Still another object of the invention is a provision of a novel wire aligning and trimming apparatus of simple construction.

Other objects and advantages of the invention will become apparent when considered in view of the following detailed description.

BRIEF DESCRIPTION OF THE DRAWING

FIG. 1 is a plan view of one embodiment of a reinforcement wire frame support having end caps applied in accordance with the present invention;

FIG. 2 is a plan view of an end portion of the wire of rectangular cross-section after bending and without modification.

FIG. 3 is a plan view similar to FIG. 2 illustrating a wire end portion after trimming;

FIG. 4A is a modified end portion of the frame of FIG. 1 illustrating the end cap in section;

FIG. 4B is a view similar to FIG. 4A illustrating a modified end cap and the positioning of the end cap upon the end of the wire member;

FIG. 5 is a view taken along line 5—5 of FIG. 1;

FIG. 6 is a top planned view of the guiding and cutting apparatus for forming the wire end portions as shown by FIG. 3;

FIG. 7 is a front elevational view of the guiding, aligning and cutting apparatus;

FIG. 8 is a side elevational view of the apparatus of FIGS. 6 and 7;

FIG. 9 is a fragmentary, rear elevational view of the apparatus of FIGS. 6-8;

FIG. 10 is an enlarged view, partly in section, of the aligning, guiding, cutting and driving assemblies;

FIG. 11 is an enlarged, fragmentary, perspective view of the guiding and aligning assembly;

FIG. 12 is a frame end portion illustrating the cap in section; and

FIG. 13 is a fragmentary, schematic, plan view of means for inducing high frequency microwaves to the wire member ends within the plastic end caps.

DETAILED DESCRIPTION OF THE INVENTION

Referring to the drawings, reference numeral 20 represents one embodiment of a garment supporting frame member which is formed of wire having a rectangular cross-sectional configuration. The wire frame 21 may be of various non-corrosive metals having the desired elasticity and strength for conforming to the wearers body while providing adequate support. The major cross-sectional dimension x, FIG. 4A, extends radially with respect to the curvature of the wire frame 21 and the minor cross-sectional dimension y, FIG. 5, extends perpendicular to the plane in which the arcuate frame normally lies, thus providing a greater degree of lateral flexibility than longitudinal flexibility. End caps or covers 22 are secured to the end portions of the wire frame 21 protect the wearer of a garment incorporating such support frames and to prevent the wire ends from wearing through the garment fabric. Preferably, the width of each cap 22 generally corresponds to the width x of the wire frame. However, the caps 22 may be substantially wider than the wire frame, as shown by FIG. 12. The cap end portion 24 is smooth and rounded and may be tapered slightly towards the rounded end.

In the embodiment of FIGS. 1, 3, 4A, 5, each end of the wire frame 21 is provided with a portion 26, having a predetermined, reduced width z, which defines spaced shoulders 28. The apparatus for forming the reduced width portions 26 and shoulders 28 will be subsequently described. The end caps 22 may be formed of rubber, plastic or other suitable constructions, but preferably are formed of a plastic material having properties which provide an excellent melt adhesion to metal. One end 30 of the cap is provided with an opening for receiving the reduced end portion 26 of the frame and, as shown by the drawings, the end 30 rests adjacent the shoulders 28. The tip portion 26 and the opening within the protective cap 22 are dimensioned such that the cap snugly receives the portion 26.

As shown by FIG. 4B, the cap 22' may include a stop 23 for spacing the end of the wire member from the inner end of the cap opening.

FIGS. 6-11 illustrate apparatus for modifying the end portions of the wire frame as shown by FIG. 3.

The apparatus includes a support frame 38 which includes a work support or table top 34 mounted upon spaced, vertical frames 40 which are interconnected by front and rear members 42. Supported upon the table top 34 are a pair of angularly disposed work support bars 32 and 44, the bar 32 supporting wire frames 21 to be cut and the bar 44 supporting the wire frames having reduced width end portions. Spacers 36, which may be adjustable, support, the bars 32 and 44 above the work surface 34.

A cutter assembly 46, FIG. 10, is enclosed within a housing 48, having a cap 49, attached in a suitable manner to the table top 34. The cutter assembly includes a shaft 50 rotatably supported within housing 48 by bearings 52, 54. The shaft 50 is driven in a conventional manner by motor 58 through pulleys and a gear belt. The drive motor 58 is supported by bracket 62 secured to the table top 34. The cover assembly 60 encloses the pulleys and gear belt which drive shaft 50.

The end portion of the shaft 50 opposite the drive pulley supports a pair of tungsten carbide saws 64, 66 positioned intermediate spacer 68 and spacers 70 and 72. The spacer 72 abuts a shoulder of shaft 50 while a fastener 77 abuts the spacer 70. All spacers as well as the carbide saws 64, 66 are secured for rotation with shaft 50 by key 76 and fastener 77. The width of spacer 68 corresponds to the width z of end portion 26.

The housing 48 is provided with an upper opening 78 for receiving a guide member 80, a pair of guide blocks 82 and a support 84 for the guide blocks. The guide blocks 82 and support 84 are suitably secured together and attached to a bracket 86. The bracket 86 is mounted upon the table top or housing 48 in a suitable, conventional manner. Guide 80 is secured to the end cap 49 of housing 48 in a conventional manner.

Referring to FIGS. 10 and 11, the adjacent upper end portions of guide blocks 82, 82 are curved to facilitate the guiding of an end portion of a wire frame, as shown by FIG. 2. The central and lowermost adjacent portions of guide blocks 82, 82 are spaced apart defining a slot 81 approximately equal to the dimension y, FIG. 5, of the wire frame. The guide 80 is substantially shorter in length than blocks 82 and extends above the table top 34 a short distance. The member 80 is centrally positioned with respect to the slot 81 and has the upper, intermost edges 84 curved outwardly and away from guide blocks 82, 82 as shown by FIG. 10.

The thickness of the blocks 82, 82 substantially corresponds to the dimension x of the wire frame, while the width of the slot 81 substantially corresponds to dimension y of the wire frame. Thus it can be seen that guide blocks 82, 82, support 84 and the guide 80 serve to guide and vertically align the end of a wire frame for presentation to the carbide saws 64, 66.

The spacer 68 intermediate the saws 64 and 66 determines the width as well as the length of the end portion 26 of the wire frame. The saws 64, 66 and spacer 68 are aligned with the slot 81 such that the end portion 26 is approximately centrally located with shoulders 28, 28 on each side.

An opening 90 is provided in the housing 48 beneath the saws 64, 66, and small particles of metal waste removed from the wire frame end by the saws fall through the opening and into an inclined waste chute 92 which conveys the waste to a receptacle 94. The upper end of the chute is supported beneath the table top by bracket 96. The receptacle 94 includes flanges supported by spaced slides 98, 98 extending between the front and rear members 42, 42.

In operation of the wire nipping apparatus, an operator picks up a wire frame 21, having end portions as shown by FIG. 2, from the support bar 32 and directs an end portion into slot 81. As the end is urged downwardly, the saws of 64, 66 remove portions and the waste particles are directed to receptacle 94. The operator continues to urge the end portion downwardly until the reduced width portion 26 abuts the spacer 68 between the saws. The nipped end portion is removed and the other end of the wire frame is nipped in a similar manner. After both ends have been nipped, the wire frame, having end portions as shown by FIG. 3, is positioned upon the work support 44.

An operator removes the wire frame from support 44 and applies an end cap 22 to each end portion, with the end of the reduced portion of the wire frame abutting the bottom of the rectangular opening in end cap 22. The plastic end caps 22 are electronically heat set upon the wire by high frequency microwaves directed to the wire frame end portions. As the metal is heated, it instantaneously melts the inner portions of the plastic caps defining the cap openings which adhere to the metal thus fixedly securing the caps upon the wire frame. The high frequency waves, which may be approximately 200,000 hertz, may be applied to the wire frame ends by conventional RF generator means 98, as the wire frames are stationary or as they are displaced through a generator load coil by a conveyor.

The plastic end caps also may be adhered to the wire frame ends, as shown by FIGS. 4A, 4B, 12 by glueing.

What is claimed is:

1. The method of fixedly securing a plastic end cap to an end portion of a wire frame member having a desired arcuate configuration comprising the steps of removing selected portions from a wire frame member end portion to define a shoulder and a reduced tip portion having a predetermined length selectively positioning an end cap, having an opening of rectangular cross-sectional configuration generally conforming to the rectangular cross-sectional configuration of the reduced tip portion, for snugly receiving the reduced tip portion, and adhering the end cap upon the reduced tip portion.

2. The method as recited in claim 1, wherein said end cap is selectively positioned upon said reduced tip portion with the end of the reduced tip portion being spaced from the bottom of the rectangular opening.

3. The method as recited in claim 1, wherein said end cap is selectively positioned upon said reduced tip portion with the bottom of the end cap opening abutting the end of the reduced tip portion.

4. The method as recited in claim 1, wherein the end cap is adhered to the reduced tip portion by deforming the innermost portions of the end cap defining the opening while maintaining the outermost surfaces of the end cap in their original configuration to lock the end cap upon the reduced tip portion.

5. The method as recited in claim 4, wherein the innermost portions of the plastic cap are deformed by transmitting high frequency microwaves to the reduced tip portion of the wire frame member to lock the protective cap upon the wire frame.

6. The method as recited in claim 5, wherein the protective end cap is formed of plastic having good melt adhesion to the wire frame member.

7. The method as recited in claim 1, wherein the end cap is adhered to the reduced tip portion by glueing.

8. The method as recited in claim 1, wherein selected portions of an end portion of the wire frame member are removed by displacing the end member a prescribed distance relative to a pair of spaced rotating saw members to form the reduced tip portion of a shoulder at each side of the reduced tip portion.

9. The method as recited in claim 8, wherein the spaced saws remove substantially equal portions from opposite sides of the frame member end portion and define substantially parallel edges along the entire length of the reduced tip portion.

10. The method of forming a reinforcement frame for use in cups of brassieres comprising the steps of; bending a length of resilient wire having a generally rectangular cross-section into a generally U-shaped formation, sequentially removing selected portions from first and second ends of the bent wire by sawing substantially equal portions from opposite sides of each wire end to form spaced shoulders and a reduced width central end portion having substantially parallel edges, selectively placing a plastic protective end cap having an opening therein over the substantially parallel edges of each reduced width portion, and instantaneously melting the innermost portions of the plastic end caps defining the cap openings to fixedly secure the end caps to the reduced width end portions by inducing high frequency microwaves into the reduced width portion.

11. The method as recited in claim 10, wherein an end cap is selectively placed upon each reduced width portion with the end of the reduced portion being spaced a prescribed distance from the bottom of the end cap opening.

12. The method of forming a reinforcement frame for use in cups of brassieres and the like comprising the steps of bending a length of resilient wire having a generally rectangular cross-section into a generally U-shaped configuration, selectively positioning a protective plastic end cap, having an opening therein for snugly receiving a wire end portion, upon each end of the wire member, and adhering the end caps to the wire frame.

13. The method as recited in claim 12, wherein the end caps are adhered to the wire frame by inducing high frequency microwaves into the wire frame end portions to instantaneously melt the innermost portions of the end caps defining the openings to fixedly lock the end caps upon the frame end portions.

* * * * *